United States Patent
Druart et al.

(10) Patent No.: US 9,316,541 B2
(45) Date of Patent: Apr. 19, 2016

(54) IMAGING SYSTEM COMPRISING A FRESNEL LENS

(75) Inventors: Guillaume Druart, Palaiseau (FR); Florence De La Barriere, Clichy-sous-Bois (FR); Arnaud Crastes, Maubec (FR)

(73) Assignees: OFFICE NATIONAL D'ETUDES ET DE RECHERCHES AEROSPATIALES (ONERA) (FR); ULIS (FR)

( * ) Notice: Subject to any disclaimer, the term of this patent is extended or adjusted under 35 U.S.C. 154(b) by 318 days.

(21) Appl. No.: 14/111,697

(22) PCT Filed: Apr. 16, 2012

(86) PCT No.: PCT/FR2012/050832
§ 371 (c)(1),
(2), (4) Date: Jan. 6, 2014

(87) PCT Pub. No.: WO2012/140389
PCT Pub. Date: Oct. 18, 2012

(65) Prior Publication Data
US 2014/0111651 A1    Apr. 24, 2014

(30) Foreign Application Priority Data
Apr. 14, 2011    (FR) ...................... 11 53222

(51) Int. Cl.
*G01J 5/10* (2006.01)
*G02B 3/08* (2006.01)
(Continued)

(52) U.S. Cl.
CPC ................. *G01J 5/10* (2013.01); *G01J 5/0806* (2013.01); *G02B 3/08* (2013.01); *G02B 13/14* (2013.01); *G02B 27/0025* (2013.01); *H04N 5/332* (2013.01)

(58) Field of Classification Search
CPC .......... G01J 5/0806; G01J 5/10; G02B 13/14; G02B 27/0025; G02B 3/08; H04N 5/332
USPC .......................... 348/164; 250/340, 352, 353
See application file for complete search history.

(56) References Cited

U.S. PATENT DOCUMENTS

| 5,161,057 A | 11/1992 | Johnson |
| 6,493,155 B1 | 12/2002 | Lee et al. |

(Continued)

FOREIGN PATENT DOCUMENTS

| EP | 1077386 A1 | 2/2001 |
| FR | 2936878 A1 | 4/2009 |

(Continued)

OTHER PUBLICATIONS

International Preliminary Report on Patentability for corresponding application PCT/FR2012/050832 filed Apr. 16, 2012.
(Continued)

*Primary Examiner* — Behrooz Senfi
(74) *Attorney, Agent, or Firm* — Cantor Colburn LLP

(57) ABSTRACT

The imaging system for imaging field rays comprises a detection surface, a device for focusing the field rays with said detection surface, and a diaphragm. Said device comprises a Fresnel lens comprising a first dioptre, the non-plane surface of which, called the active zone, makes it possible to focus the field rays towards said detection surface, and said diaphragm allows controlled distribution of the field rays over said active zone.

16 Claims, 5 Drawing Sheets

(51) Int. Cl.
   *G02B 13/14* (2006.01)
   *G02B 27/00* (2006.01)
   *G01J 5/08* (2006.01)
   *H04N 5/33* (2006.01)

(56) References Cited

U.S. PATENT DOCUMENTS

| | | |
|---|---|---|
| 2004/0141241 A1 | 7/2004 | Claytor |
| 2007/0002467 A1 | 1/2007 | Claytor |
| 2007/0285554 A1* | 12/2007 | Givon .................... G03H 1/268 348/340 |
| 2009/0225215 A1 | 9/2009 | Korenaga et al. |
| 2012/0013706 A1* | 1/2012 | Druart .................... G02B 13/16 348/36 |
| 2014/0063214 A1* | 3/2014 | Gidon .................... G03B 37/06 348/61 |

FOREIGN PATENT DOCUMENTS

| | | |
|---|---|---|
| JP | 2001141993 A | 5/2001 |
| WO | 2007138540 A1 | 12/2007 |

OTHER PUBLICATIONS

International Search Report for corresponding application PCT/FR2012/050832 filed Apr. 16, 2012; Mail date Jul. 31, 2012.

* cited by examiner

IMAGING SYSTEM COMPRISING A FRESNEL LENS

TECHNICAL FIELD

The present invention relates to the field of the design of optical systems for imaging field rays, having highly constrained bulk and mass. The invention is especially applicable to infrared (IR) imaging, field rays being by definition light rays originating from a scene located at infinity and passing through the center of the entrance pupil.

BACKGROUND

Various small optical imaging systems exist, especially for imaging in the infrared spectral domain.

There are two categories of optical systems in this field:
uncooled systems; and
cooled systems.

In both these categories, it is desirable to decrease the bulk and mass of the imaging optics.

The prior art envisions three solutions, which may be combined:
1. limiting the number of lenses;
2. using thinner lenses such as Fresnel lenses or multichannel lenses; and/or
3. using lenses manufactured from a lighter material.

Regarding the category of uncooled systems, the first solution is generally employed i.e. the number of lenses is limited to two. Regarding more particularly the uncooled imaging systems used in the infrared, denoted IR, spectral domain, this minimum of two lenses is most often used to form a Petzval architecture consisting of a focusing first lens and a field-flattening lens allowing field curvature to be corrected.

Patent JP 2001/141993 A adds to this first solution, consisting in limiting the number of lenses to two, the replacement of conventional lenses with thin Fresnel lenses.

Patent U.S. 2007/0002467 A1 also adds a third solution to these first two solutions, this third solution consisting in using low-cost materials such as polyethylene, which can be used only in the context of thin lenses because of its high absorption. This United States patent especially describes uncooled infrared detectors of the microbolometer type.

The main drawbacks of these architectures are their low optical range, their low sensitivity, and the low resolution of the images obtained. This is especially due to the Fresnel lenses being used in diffractive mode, in which mode they have the drawback of being very chromatic.

Regarding the category of cooled systems, U.S. patent application FR 2 936 878 describes an optical imaging system comprising a dark chamber containing a detection chip, a single lens, which is not necessarily thin, and a diaphragm placed upstream of this lens. In the case where said lens is not thin, this system is required to cool an additional mass of optics relative to a system using a thin lens as its single lens, thus this would be a drawback because this additional mass to be cooled would increase the cool-down time of the optical system.

Regarding both categories of systems, i.e. both cooled and uncooled systems, another solution for limiting the thickness of the lenses is to use a multichannel system based on a matrix of microlenses. This solution has the drawback of requiring microlenses with large sags, which are difficult to produce.

BRIEF SUMMARY

One aim of the invention comprises obtaining a cooled or uncooled optical imaging system that can especially be used in the IR spectral domain and that has a low bulk, while limiting the main drawbacks of prior art systems, which are microlenses having a large sag making them difficult to produce, or a lens thickness making them too absorbent, or a relatively high lens mass making cooling them rapidly difficult, or a poor image quality relative to that of conventional optical systems.

Definitions

In the rest of the text the following expressions have the following meanings:

"Fresnel lens": a lens comprising, on at least one of its dioptres, called the "active dioptre" or "active zone" of the plate comprising said Fresnel lens, an array of discontinuities particularly in transmittance, refractive index or thickness the effect of which is, for the working wavelength, $\lambda_0$, to produce a diffraction efficiency near 100% for a diffraction order p, the phases of the field rays transmitted through these discontinuities being shifted an integer number times $p \cdot 2\pi$. A frequent example is that of thickness discontinuities, where the lens is composed of a plurality of concentric ring-shaped areas having equivalent curvatures to a simple refractive lens, separated by thickness discontinuities. As is known in the art, a Fresnel lens may be made of a transparent plastic such as, for example, polyethylene.

"detection assembly": a device comprising at least one detector. In this invention, this is an optical detector. The detection assembly is often a vacuum chamber comprising a window and a detector held stationary relative to its optical axis. Said window may also seal this chamber. In the case of cooled systems, this detection assembly may comprise a cold plate for cooling and holding the detector and a cold screen in order to limit the instrumental background seen by the detector; it is then associated with a cooling or athermalization device.

"focusing device": an "optically conjugating device" the optical power of which is sufficient to allow it alone to focus the field rays onto the detector.

"holding device": a device allowing the various components of the optical imaging system to be mechanically integrated. This holding device may be sealed by a window.

"upstream" and "downstream" allow the various components to be located one relative to the other along an optical axis oriented in the propagation direction of the light, i.e. from the diaphragm, upstream, to the detection assembly, downstream. The expression "component 1 is upstream of component 2" is therefore understood to mean that component 1 is located before component 2 in the propagation direction of the field rays, and vice versa for downstream.

The invention relates to a system for imaging field rays originating from any point in an observed scene, comprising:
a detector;
a diaphragm placed upstream of the detector and located a distance $d_0$ from said any point in the observed scene; and
a device for focusing the field rays onto the detector, the focusing device being designed for a working wavelength $\lambda_0$ comprised in the spectral band of the observed scene, the active dioptre of the focusing device being placed between the diaphragm and the detector:
at a distance $d_l$ from the diaphragm minimizing astigmatic aberration at the detector; and
at a distance $d_d$ from the detector, the distance $d_d$ depending on the distance $d_0$ and being the focal distance of said active dioptre, the imaging system being characterized in that:
    the focusing device comprises a a plate (900) having parallel sides, said plate (900) comprising at least one Fresnel dioptre that is the active dioptre of the focusing device and that supplies most of the optical power of said focusing device, this optical power being generated by phase-continuity zones of said active dioptre, said phase-continuity zones essentially functioning in refractive mode, said optical power being adapted to focus the field rays onto the detector;
    said active dioptre is designed to the order p for the working wavelength, the order p being greater than or equal to three, in order to obtain many diffraction orders in the spectral band of the observed scene, the order p may be obtained in different ways and particularly by thickness variation, refraction index gradient, or local variation of the absorption; and
    the aperture $L_d$ of the diaphragm placed upstream of the active dioptre is smaller than $L_{dmax}=L_4 \cdot d_0/(d_0+d_1)$, where $L_4$ is the smallest distance between four consecutive discontinuities of the Fresnel lens in order on the one hand, to limit to 3 the maximum number of phase-discontinuity zones illuminated by said field rays for a given angle of incidence, and on the other hand, to make allowance for a local correction of aberrations, which correction is adapted to the angle of incidence of said field rays;
    said active dioptre is designed to make said local correction of aberrations,
    the imaging system consequently achieving two advantageous results, namely:
        a wider spectral band than that of imaging systems using a focusing device comprising a conventional Fresnel lens; and
        the mass of its focusing device is lower than that of an imaging system the focusing device of which uses a refractive lens.

It will be noted that the distances $d_1$, $L_4$, $d_d$ may be calculated using an optical ray-tracing software package such as ZEMAX, Code V or OSLO and that the distance $d_1$ may also be calculated using Zenike or Seidel coefficients.

In this invention, the use of a small number of flat lenses, or even the use of a single Fresnel lens, allows the bulk of the imaging system to be decreased while guaranteeing a high image quality, especially by coding optical power at a single dioptre, more precisely in its active zone. The latter is especially used to focus the field rays onto the detection area of the optical detector. Specifically, this system has the advantage of being very compact, relative to prior-art architectures, while having a high optical quality over a very wide field of view.

The imaging system may be incorporated into a low-cost camera for home automation applications using a Fresnel lens.

Another advantage is the ease with which the imaging system can be manufactured since only a single dioptre of a single plate needs to be polished to produce the focusing device whereas, conventionally, a meniscus lens is used, meniscus lenses being more difficult to manufacture and incorporate.

Using a Fresnel lens the discontinuities of which are thickness discontinuities allows the mass of the imaging system of the invention to be decreased while ensuring the image formed on the optical detector still has a high resolution.

Various configurations allow the correction of optical aberrations of various natures to be optimized, in particular the position of the diaphragm and the correction made by the active zone may be set in order to minimize:

field aberrations such as astigmatism, coma, and field curvature;
    spherical aberration; and
    distortion.

In this invention, the distance between the diaphragm and the active zone of the first dioptre of the Fresnel lens, and the diameter of the entrance pupil (smaller than the diameter of the active zone) are set so that their configuration allows incident rays to illuminate a portion of the area of the active zone of the first dioptre, thus making it possible to use local correction of the field rays by this active zone to form a better image on the focal plane, the latter being located in the plane comprising the photosensitive area of the optical detector.

Using a Fresnel lens to correct the field rays locally furthermore allows an imaging system comprising a single lens to be used.

The area of the active zone of the first dioptre of the Fresnel lens is calculated in order to correct optical aberrations specific to each field of observation. In particular, a correction is made by each of the area elements of the active zone. The optical aberrations specific to each field of the system are thus corrected.

The active zone of the Fresnel lens may be aspheric.

The architecture of the imaging system may be optimized using an optical design software package allowing the curvature, the conicity, the asphericity, the thickness of any lens and the position of the diaphragm and the focal plane to be adjusted.

Advantageously, said active dioptre is designed to order p for the working wavelength, the order p being higher than 10.

Advantageously, the focusing device of the imaging system comprises, in series, a plurality of plates each comprising one or more Fresnel lenses.

One advantage of using one or more Fresnel lenses is that this allows the focusing power of each lens to be decreased and therefore the etch depths to be decreased or the size of the Fresnel zones to be increased—the size of the Fresnel zones becomes problematic in the case of plastic (for example polyethylene) microlenses.

Advantageously, the detector forms part of an optical detection assembly that is a vacuum chamber optically apertured via a window that moreover seals said chamber, said window and said detector being held stationary one relative to the other, their respective optical axes being coincident.

Advantageously, the detector may detect field rays in the infrared spectral domain, said detector preferably being a microbolometer in the case where said imaging system is uncooled.

For a microbolometer, it is necessary to have a wide aperture in order to increase the light flux entering the system, but this decreases depth of field.

In the case of a cooled IR detector, the aperture may be smaller.

The imaging system may be incorporated into a cooled infrared camera that uses an imaging cold filter.

One advantage of using the imaging system in the infrared domain is that less dispersive materials having a higher index than customarily used in the visible domain may be employed. For example materials such as germanium, silicon, or even chalcogenide glasses and zinc or selenium sulphide (ZnS or ZnSe), may be used. These materials allow dispersive effects to be minimized and allow optical aberrations to be effectively corrected with a small number of optical components.

One advantage of use in the cooled infrared domain is that the mass of the system is decreased by virtue in particular of the Fresnel lens. This solution enables temperature to be decreased more rapidly than is possible with current systems.

The imaging system of the invention allows a high image quality to be obtained, in particular in the infrared spectral domain, while minimizing manufacturing cost, in particular by using a single plate.

In particular, the decrease in the manufacturing cost of the imaging system of the invention is advantageously obtained via:
- a manufacturing process that is compatible with silicon-wafer fabrication processes or moulding processes (chalcogenide materials or polyethylene);
- the use of a single lens;
- the use of a single machined dioptre;
- compatibility with the use of low-cost materials such as, for example, polyethylene.

Advantageously, a filter is placed between the diaphragm and the detector, said filter possibly being integrated into the plate comprising said Fresnel lens.

Advantageously, the imaging system comprises a device for holding all of its optical components, comprising a screen surrounding and holding said components, and the aperture of which is said diaphragm, said screen being sealed by a window possibly having a function of shaping the field rays, especially a shaping function equivalent to that of a Schmidt plate. In the case where a cold screen is used the window is not integrated into the cold screen. This holding assembly may be used, as with a camera obscura, to block rays from the scene lying outside of the field of view of the system.

According to one embodiment, the holding assembly may comprise a system of baffles in order to limit reflection of the field rays.

Advantageously, the imaging system comprises a device for cooling or athermalizing the optical components of said imaging system, said device, possibly a cryostat, being optically apertured by a window also sealing it, and containing said screen without its window.

The cold screen is used to limit the instrumental background seen by the detector.

In the field of cold optics, in the case where a cryostat is used, the imaging system of the invention may advantageously comprise optics themselves providing the cold-filter function. This solution then makes it possible to give the cryostat an imaging function without introducing any additional optics.

Lastly, it is simple to transfer the system of the invention from the field of cooled optics to that of uncooled optics, and vice versa.

Advantageously, one of the dioptres of the Fresnel lens, preferably the dioptre located upstream of the dioptre, called the active dioptre, of this lens comprising said discontinuities, in order to reduce the incidence of said field rays and thus limit shadowing effects on the active dioptre, is partially covered with an opaque layer in order to provide the function of said diaphragm.

These shadows are due to the discontinuities in the first dioptre.

In this embodiment, the curvatures of the first and second dioptres may be such as to optimize the limitation of shadowing effects, by allowing the field rays to be deviated at the interface between the air and the material of the plate comprising said Fresnel lens.

Advantageously, the imaging system is a multichannel imaging system characterized in that said diaphragm comprises a plurality of transparent portions, said Fresnel lens being located on a plate comprising a plurality of Fresnel lenses, forming a plurality of optical channels each conjugated to a detection area, each of the optical channels comprising a field-limiting device allowing the various channels to be optically isolated from each other.

The imaging system may be decoupled in order to form an ultra-compact multichannel system integrated at the detector and using a matrix of Fresnel lenses.

In the case of a multichannel application, the diaphragm may comprise a plurality of transparent portions that are optionally different. The plate may comprise a plurality of Fresnel lenses that are optionally different, so as to provide a plurality of optical channels each of which is associated with a detection area. The imaging system may then comprise an optical filter and a device for limiting the field of each of the optical channels.

Advantageously, the arrangement of the components of the multichannel imaging system allows elementary images to be formed and combined, an image processing device allowing these elementary images to be exploited in order to increase the resolution of the image output from the imaging system.

Advantageously, the multichannel imaging system comprises filtering devices functioning in different spectral bands in order to provide a multispectral camera function.

In this multichannel embodiment, a filter is associated with each channel, each filter having different spectral properties, in order to provide a multispectral camera function.

Advantageously, the multichannel imaging system comprises optical channels sighting different optical directions, and an image processing device able to exploit the elementary images in order to increase the observation field angle of said imaging system.

The expression "elementary image" is understood to mean an image produced by one of the optical channels. The arrangement of the components of the multichannel imaging system, allows elementary images to be formed and combined. Combining the elementary images using an image processing device allows the elementary images to be exploited in order to increase the resolution of the image output from the imaging system.

Advantageously, the multichannel imaging system is such that the filtering devices function in different spectral bands in order to provide a multispectral camera function.

Advantageously, the multichannel imaging system is such that the optical channels sight different optical directions, and it comprises an image processing device able to exploit the elementary images, in order to increase the observation field angle of said imaging system Advantageously, the cut-off frequency of the imaging system is above the Nyquist frequency, equal to the inverse of twice the sampling rate of the detector.

The imaging system of the invention allows a cut-off frequency above the Nyquist frequency to be obtained. The cut-off frequency is also adapted to the sampling rate of the detection assembly. This choice allows a high image quality to be obtained, in particular a fine resolution.

The invention also relates to a method for imaging, on a detector, using a focusing device comprising a plate (900) having parallel sides and comprising at least one Fresnel dioptre which is the active dioptre of the focusing device of working wavelength $\lambda_0$ comprised in the spectral band of an observed scene, the focusing device being placed downstream of a diaphragm, field rays originating from any point in an observed scene located a distance $d_0$ from the diaphragm, comprising the following step:
- calculating the distance $d_1$ between the diaphragm and the actie dioptre of the focusing device allowing astigmatic aberration at the detector to be minimized, characterized in that it comprises the following additional steps:

choosing an optical power of the active dioptre of the Fresnel lens, said active dioptre supplies most of the optical power of said focusing device, this optical power being generated by phase-continuity zones of said active dioptre, said phase-continuity zones essentially functioning in refractive mode, said optical power being adapted to focus the field rays onto the detector;

focusing the field rays onto the detector, by means of said active dioptre designed to order p for the working wavelength, said order p being greater or equal to three, in order to obtain many diffraction orders in the spectral band of the observed scene;

calculating the smallest distance $L_4$ between four consecutive discontinuities in the Fresnel lens, and the distance $d_d$ between the focusing device and the detector, the distance $d_d$ depending on the distance $d_0$ and being the focal distance of said active dioptre; and decreasing, if necessary, the aperture $L_d$ of the diaphragm placed upstream of the active dioptre, until it is smaller than $L_{dmax}=L_4 \cdot d_0/(d_0+d_1)$, in order on the one hand, to limit to 3 the maximum number of phase-discontinuity zones illuminated by said field rays for a given angle of incidence, and on the other hand, to make allowance for a local correction of aberrations, which correction is adapted to the angle of incidence of said field rays;

said active dioptre is designed to make said local correction of aberrations, the imaging method consequently achieving two advantageous results, namely:

it has a wider spectral band than that of imaging systems using a focusing device comprising a conventional Fresnel lens; and it can be implemented by an imaging system having a focusing device the mass of which is lower than that of an imaging system the focusing device of which uses a refractive lens.

The distances $d_1$, $L_4$, $d_d$ may be calculated using an optical software package such as ZEMAX, Code V or OSLO. The distance $d_1$ may also be calculated using Zenike or Seidel coefficients. In a particularly advantageous way, the order p is higher than 10.

BRIEF DESCRIPTION OF THE FIGURES

The figures given below illustrate example embodiments, but other embodiments are of course possible.

DETAILED DESCRIPTION

Figure 1:
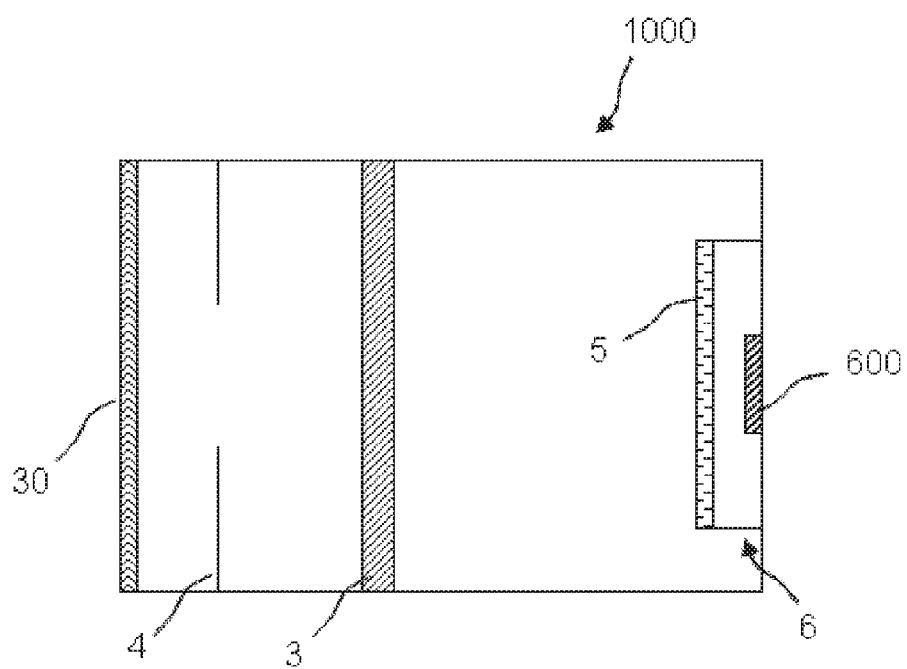
FIG. 1: an imaging system according to one embodiment of the invention comprising a Fresnel lens.

FIG. 1 shows a system for imaging 1 field rays according to one embodiment of the invention, comprising a device for holding components of the imaging system. This holding device is also used, as with a camera obscura, to block rays from the scene lying beyond the field of view of the system.

Physically, the diaphragm may be a plate in which a hole has been drilled. This diaphragm thus acts as the entrance pupil of the system.

Furthermore, an additional lens may be placed in front of the diaphragm in order to orient the field rays in order to maximize the imaging performance of the system of the invention.

Figure 2:
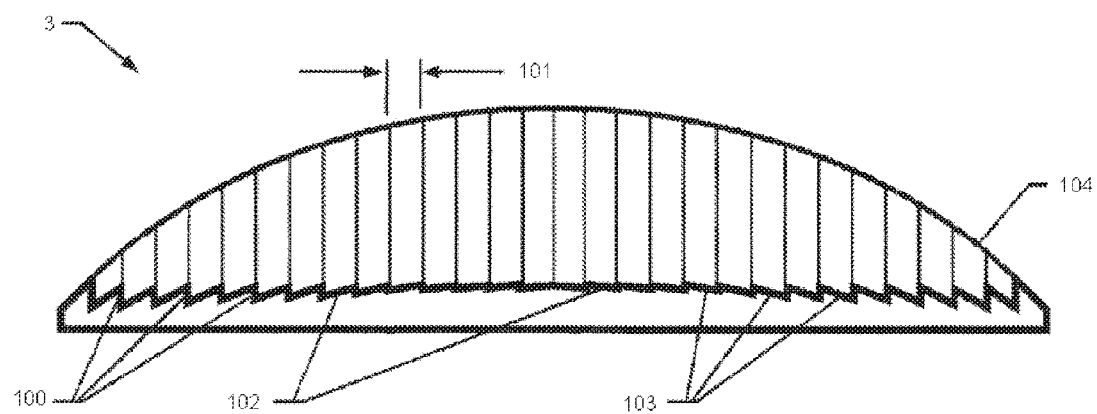
FIG. 2: a known Fresnel-lens architecture.

FIG. 2 shows a cross-sectional view of a Fresnel lens 3 comprising a plurality of Fresnel zones 104. Each zone corresponds to a circular section of the lens over a width 101. The lens is thus formed of concentric rings. The overall surface of the lens is no longer smooth but composed of a plurality of adjacent areas 100 or 102 or 103 having the same curvature and separated by discontinuities between the areas, especially between the areas 100 and 102 and the areas 102 and 103.

The Fresnel lens 3, shown in FIG. 2, codes the phase of the lens to within an additive constant equal to $m \cdot 2\pi$ at the wavelength $\lambda_0$, where m is the diffraction order centered on $\lambda_0$. Using a Fresnel lens with a high order m allows the chromatic aberration of the diffractive mode of the lens to be limited, but also allows the number of discontinuities to be decreased, thus promoting the refractive mode in the presented configuration. In a preferred embodiment, the Fresnel lens has a high working order m.

The phase variation may be coded in various ways, especially using:

thickness variations—the lens being machined in order to remove blocks of material of height $m \cdot \lambda_0/(n-n_0)$, where n is the index of the material of said lens and $n_0$ is the index of the surrounding medium, generally equal to 1 (index of air);

index gradients—either the index of the material, or the materials themselves, or the composition of the materials being varied or the lens being etched with an array of subwavelength structures creating the illusion that light passing through the structures sees materials of different index; and/or local variations in the absorption of the plate—the variation in flux obtained by the Fresnel lens may be coded by alternating more or less opaque or more or less transparent zones.

When the phase variation is coded using thickness variations, a continuous profile is obtained by diamond machining. Multilevel or binary profiles may be obtained by photolithography.

Lastly, the optics may be molded or stamped.

The plate may be structured with subwavelength patterns. These structures may be manufactured using a photolithography or nanoimprint method.

Figure 3:
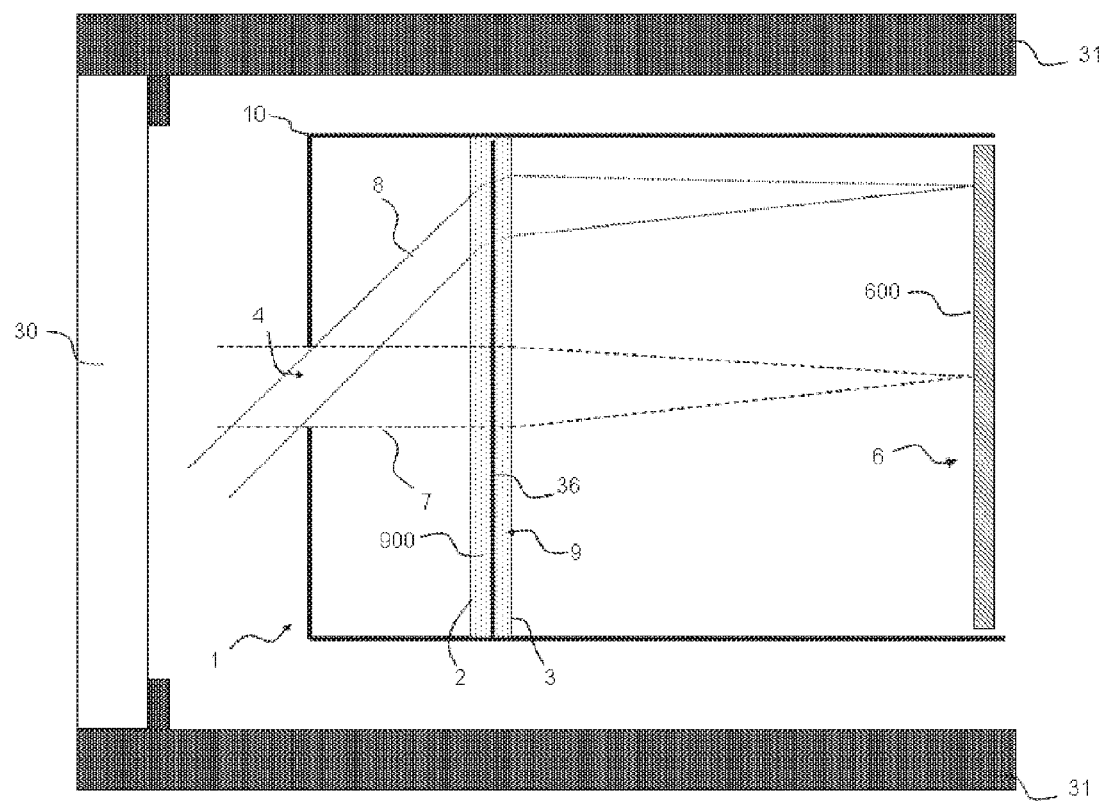
FIG. 3: an imaging system according to one embodiment of the invention comprising a cooling device.

FIG. 3 shows an embodiment in which the diaphragm is positioned in a wall of the cold screen because this allows, on the one hand, the entire system to be contained in the cold screen, the optical system and its cold pupil then also being cooled, and on the other hand, the size of the optical system to be decreased to a strict minimum.

In the embodiment shown in FIG. 3, the holding assembly comprises a cryostat 31. The cryostat comprises a first window 30 and at least one cold optical detector 600. In this configuration, the cold detector 600 may be held on a cold plate and surrounded by at least one cold screen 10. The cold plate allows the detector to be cooled. The cold screen 10 is then placed in such a way as to surround the optical detector, a cold filter and the focusing device.

The Fresnel lens and the cold filter may be merged. The plate then has a double function. A first optical function focusing the field rays and a second function as a cold filter 36. When the plate provides the cold filter function, the latter function may be obtained via a passband treatment of the plate.

Figure 4:
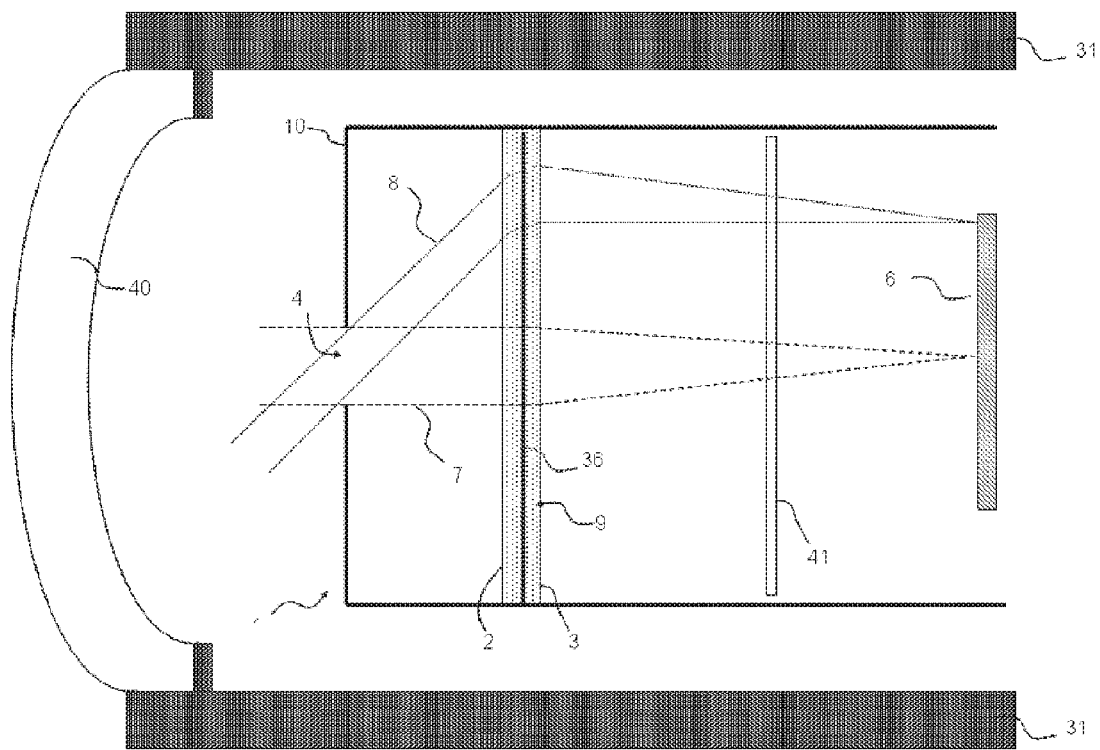
FIG. 4: an imaging system according to one embodiment of the invention comprising a field-compressing lens.

FIG. 4 shows an embodiment in which the window 30 may be replaced by a lens 40 having a window function.

In the latter variant, the window may also be a Schmidt plate allowing the field rays to be shaped. Furthermore, the window may provide a filtering function.

In an alternative embodiment, a transparent part of the diaphragm is adapted to shape the field rays in a way equivalent to a Schmidt plate.

The optical detector may be a cooled quantum detector placed in the focal plane of the optical system.

Furthermore, the imaging system may comprise an additional cold filter 41 placed anywhere on the optical path.

Figure 5:
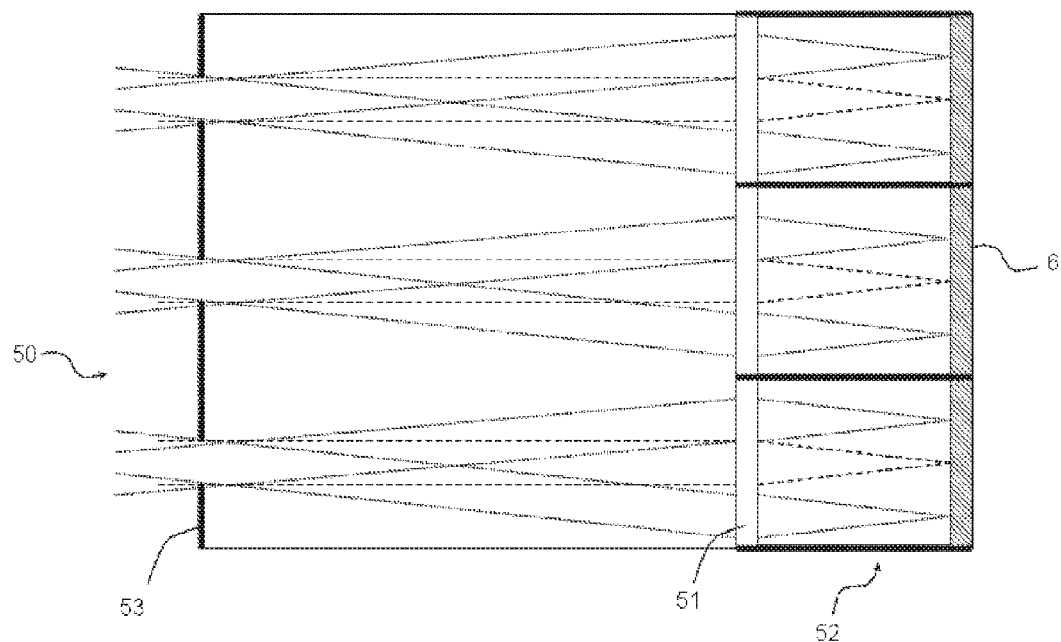
FIG. 5: a multichannel optical system according to one embodiment of the invention.

FIG. 5 shows a multichannel imaging system 50 comprising a matrix of segmented diaphragms 4. A focusing device 21 is fitted in parallel in order to form various images on a plurality of detection areas of an optical detector 600.

A matrix 52 of low walls is shown by way of an example of a device for limiting crosstalk between channels.

In this embodiment, the Fresnel lenses may be configured so that their focal length is longer than that of a single Fresnel lens of an equivalent imaging system. In the latter case, this embodiment allows constraints on the focusing device to be relaxed and correction of optical aberrations to be improved. It may be used when it is necessary to have an open optical system or if it is necessary to better correct optical aberrations in the imaging system. In this embodiment, the Fresnel lenses preferably have identical orientations.

Each of the lenses may have a specific function.

When each lens is associated with a different detection area, the system is said to have a plurality of optical channels each of which is associated with a detection area. The system may comprise an optical filter and a device for limiting the field of each of the optical channels.

It is possible to produce a plurality of Fresnel lenses, optionally configured in different ways, on a single plate. The imaging device of the invention comprises a plurality of channels. Multichannel imaging systems are then spoken of. (Different prism functions may be integrated into the Fresnel lenses so that they observe different zones of the scene).

The imaging system of the invention may be arranged in a periodic array in order to allow a TOMBO type architecture to be produced, allowing elementary images to be combined in order to obtain a better resolution. A TOMBO system is a multichannel system each of the channels of which detect the same optical field.

For use in the infrared spectral domain, it would be advantageous to use a plurality of cold screens configured to surround each optical component of said system.

The diaphragm may comprise a plurality of transparent portions that are optionally different.

Each transparent portion of the diaphragm may be placed a distance similar to the focal length of said system away from the associated active zone in order to obtain a telecentric imaging system. The field rays then arrive at the surface of the detector perpendicularly. If a filter is placed between the optics and the detector, then the field rays reaching the filter have the same color.

The invention claimed is:

1. A system for imaging field rays originating from any point in an observed scene, comprising:
    a detector;
    a diaphragm placed upstream of the detector and located at a distance $d_0$ from said any point in the observed scene; and
    a device for focusing the field rays onto the detector, the focusing device being designed for a working wavelength $\lambda_0$ comprised in the spectral band of the observed scene, the active dioptre of the focusing device being placed between the diaphragm and the detector:
        at a distance $d_1$ from the diaphragm minimizing astigmatic aberration at the detector; and
        at a distance $d_d$ from the detector, the distance $d_d$ depending on the distance $d_0$ and being the focal distance of said active dioptre,
    the imaging system wherein:
        the focusing device comprises a plate having parallel sides, said plate comprising at least one Fresnel dioptre that is the active dioptre of the focusing device and that supplies most of the optical power of said focusing device, this optical power being generated by phase-continuity zones of said active dioptre, said phase-continuity zones essentially functioning in refractive mode, said optical power being adapted to focus the field rays onto the detector;
        said active dioptre is designed to the order p for the working wavelength, the order p being greater than or equal to three, in order to obtain many diffraction orders in the spectral band of the observed scene; and
        the aperture $L_d$ of the diaphragm placed upstream of the active dioptre is smaller than $L_{dmax}=L_4 \cdot d_0/(d_0+d_1)$, where $L_4$ is the smallest distance between four consecutive discontinuities of the Fresnel lens, in order on the one hand, to limit to 3 the maximum number of phase-discontinuity zones illuminated by said field rays for a given angle of incidence, and on the other hand, to make allowance for a local correction of aberrations, which correction is adapted to the angle of incidence of said field rays;
        said active dioptre is designed to make said local correction of aberrations.

2. The imaging system as claimed in claim 1, wherein said active dioptre is designed to order p for the working wavelength, the order p being higher than 10.

3. The imaging system as claimed in claim 1, wherein the focusing device comprises, in series, a plurality of plates each comprising one or more Fresnel lenses.

4. The imaging system as claimed in claim 1, wherein the detector forms part of an optical detection assembly that is a vacuum chamber optically apertured via a window that moreover seals the chamber, the window and the detector being held stationary one relative to the other, their respective optical axes being coincident.

5. The imaging system as claimed in claim 1, wherein the detector may detect field rays in the infrared spectral domain.

6. The imaging system as claimed in claim 5, wherein the detector is a microbolometer in the case where the imaging system is uncooled.

7. The imaging system as claimed in claim 1, wherein a filter is placed between the diaphragm and the detector, said filter being integrated into the plate comprising said Fresnel lens.

8. The imaging system as claimed in claim 1, further comprising a device for holding all of its optical components, comprising a screen surrounding and holding said components, and the aperture of which is said diaphragm, said screen being sealed by a window having a function of shaping the field rays comprising a shaping function equivalent to that of a Schmidt plate.

9. The imaging system as claimed in claim 8, further comprising a device for cooling or athermalizing the optical components of said imaging system, said device, comprising a cryostat, being optically apertured by a window also sealing it, and containing said screen without its window.

10. The imaging system as claimed in claim 1, wherein one of the dioptres of said Fresnel lens, comprising the dioptre located upstream of the dioptre, called the active dioptre, of this lens comprising said discontinuities, in order to reduce the incidence of said field rays and thus limit shadowing effects on the active dioptre, is partially covered with an opaque layer in order to provide the function of said diaphragm.

11. The multichannel imaging system as claimed in claim 1, wherein said diaphragm comprises a plurality of transparent portions, said Fresnel lens being located on a plate comprising a plurality of Fresnel lenses, forming a plurality of optical channels each conjugated to a detection area, each of the optical channels comprising a field-limiting device allowing the various channels to be optically isolated from each other.

12. The multichannel imaging system as claimed in claim 11, wherein the arrangement of the components of said system allows elementary images to be formed and combined, an image processing device allowing these elementary images to be exploited in order to increase the resolution of the image output from the imaging system.

13. The multichannel imaging system as claimed in claim 11, wherein the filtering devices function in different spectral bands in order to provide a multispectral camera function.

14. The multichannel imaging system as claimed in claim 11, wherein the optical channels sight different optical directions, and further comprising an image processing device able to exploit elementary images in order to increase the observation field angle of said imaging system.

15. The imaging system as claimed in claim 1, wherein a cut-off frequency of the imaging system is above the Nyquist frequency equal to the inverse of twice the sampling rate of the detector.

16. A method for imaging, on a detector, using a focusing device comprising a plate having parallel sides and comprising at least one Fresnel dioptre which is the active dioptre of the focusing device of working wavelength $\lambda_0$ comprised in the spectral band of an observed scene, the focusing device being placed downstream of a diaphragm, field rays originating from any point in an observed scene located a distance $d_0$ from the diaphragm, comprising the following steps:

calculating the distance $d_1$ between the diaphragm and the active dioptre of the focusing device allowing astigmatic aberration at the detector to be minimized, choosing an optical power of the active dioptre of the Fresnel lens, said active dioptre supplies most of the optical power of said focusing device, this optical power being generated by phase-continuity zones of said active dioptre, said phase-continuity zones essentially functioning in refractive mode, said optical power being adapted to focus the field rays onto the detector;

focusing the field rays onto the detector, by means of said active dioptre designed to order p for the working wavelength, said order p being greater or equal to three, in order to obtain many diffraction orders in the spectral band of the observed scene;

calculating the smallest distance $L_4$ between four consecutive discontinuities in the Fresnel lens, and the distance $d_d$ between the focusing device and the detector, the distance $d_d$ depending on the distance $d_0$ and being the focal distance of said active dioptre; and decreasing, if necessary, the aperture $L_d$ of the diaphragm placed upstream of the active dioptre, until it is smaller than $L_{dmax}=L_4 \cdot d_0/(d_0+d_1)$, in order on the one hand, to limit to 3 the maximum number of phase-discontinuity zones illuminated by said field rays for a given angle of incidence, and on the other hand, to make allowance for a local correction of aberrations, which correction is adapted to the angle of incidence of said field rays;

said active dioptre is designed to make said local correction of aberrations.

* * * * *